C. STEIN.
COLLAPSIBLE CORE.
APPLICATION FILED NOV. 22, 1915.
1,275,491. Patented Aug. 13, 1918.
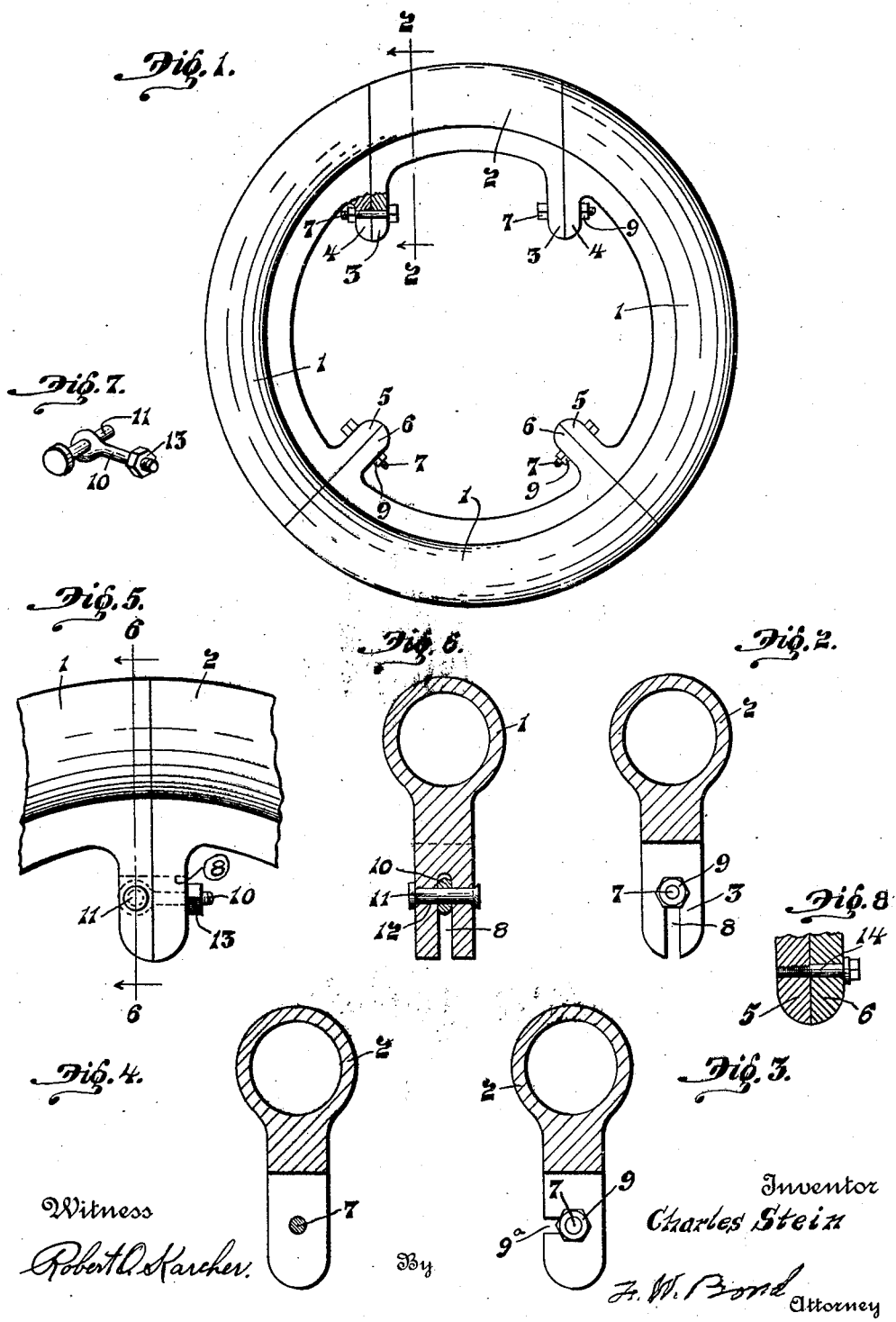

UNITED STATES PATENT OFFICE.

CHARLES STEIN, OF AKRON, OHIO.

COLLAPSIBLE CORE.

1,275,491.  Specification of Letters Patent.  Patented Aug. 13, 1918.

Application filed November 22, 1915. Serial No. 62,684.

*To all whom it may concern:*

Be it known that I, CHARLES STEIN, a citizen of the United States, residing at Akron, in the county of Summit and State of Ohio, have invented a new and useful Collapsible Core, of which the following is a specification.

My invention relates to improvements in collapsible cores for manufacturing pneumatic tires.

The objects of the present invention are, first, to provide a core made up of any desired number of sections, second, to provide means for easily assembling the segmental sections to produce a ring corresponding in diameter with the diameter of the tire designed to be manufactured, and, third, to provide means for quickly detaching the various segments.

These objects, together with other objects may be carried out by the construction illustrated in the accompanying drawing, although other slight modifications may be provided without departing from the spirit of the present invention.

In the drawings:

Figure 1 is a plan view of a ring core embodying my invention, showing the various segments properly connected together.

Fig. 2 is a section on line 2—2, Fig. 1.

Fig. 3 is a similar view showing a slight modification.

Fig. 4 is a similar view showing a further slight modification.

Fig. 5 is a view showing portions of two segmental sections united together with a slight modification of the clamping means.

Fig. 6 is a section on line 6—6, Fig. 5.

Fig. 7 is a detached view of one of the clamping means.

Fig. 8 is a view showing a portion of the connecting flanges and a slight modification of clamping means.

Similar numerals of reference indicate corresponding parts in all the figures of the drawing.

In the accompanying drawing, the numeral 1 represents a series of segmental core sections and as shown both ends of one of the sections terminate in radial planes and one end of two of the segmental sections are located in a plane at an angle to a radial line, by which arrangement the segmental section 2 having its ends terminated in planes at angles to a radial line can be moved inward or outward, owing to the fact that the abutting ends are located parallel with reference to each other. The segmental sections 1 and 2 are provided with the inward extending flanges 3, 4, 5 and 6. The abutting faces of all of the flanges are located in the same planes as the abutting ends of the various segmental sections and are so located for the purpose of allowing the segmental sections to be properly assembled and disassembled. It will be understood that by locating the various flanges as shown and extending the same inwardly toward the center of the core ring they will assist in bracing the various segments when the flanges are clamped snugly together as hereinafter described.

For the purpose of clamping the flanges 3, and 4, and 5 and 6 clamping bolts 7 are provided, which clamping bolts may be of any desired form. It is well understood that provision should be made for easily connecting the different parts going to make up the core proper and in order to provide for the quick adjustment of the bolts I provide the inner ends of the various flanges with open slots 8 by means of which the various clamping bolts can be moved bodily into the position shown in Figs. 1 and 2 and when brought into their proper positions the clamping nuts 9 can be tightened, thereby snugly clamping the flanges together and bringing the various segmental sections into proper relationship with reference to each other. In Fig. 3 I have shown a slight modification, which simply consists in locating the slot 9ª in one side of each of the flanges rather than the inner end of it. Should it be desired to so construct the clamping means that they will not become detached when the core sections are disassembled, an eye bolt such as 10 may be employed and the cross pin or bar 11 located through a suitable cross aperture 12, as best illustrated in Fig. 6.

It will be understood that when the nut 13 is used, it may be turned away from the face of the flange when the bolt can be turned downward through the open slot 8 and the sections disconnected without entirely detaching the clamping means. In Fig. 4 a slight modification is illustrated, which consists in an aperture to receive the bolt.

It will be understood that the usual means for preventing relative lateral movement as between the various segmental sections should be provided. These means are so common and well known in the art and forming no particular part of the present invention, they are not illustrated.

The modification illustrated in Fig. 8 pertains more specifically to a slight modification of means for clamping the segments together and it consists in providing a simple cap or lug bolt 14. It will be understood that by locating the clamping bolts tangentially with reference to the annular core the segmental sections can be drawn together and at the same time by extending the flanges inwardly and locating the clamping device through the inwardly extended flanges the core can be easily disassembled.

Having fully described my invention what I claim as new and desire to secure by Letters Patent, is:

In a collapsible core of the class described, the combination of a series of segmental sections adapted to be assembled end to end, the abutting faces of the segmental ends and flanges located in the same plane, a clamping bolt pivotally connected to one of the abutting flanges and the opposite flange provided with an open recess adapted to receive said pivoted clamping bolt.

In testimony that I claim the above, I have hereunto subscribed my name.

CHARLES STEIN.

Copies of this patent may be obtained for five cents each, by addressing the "Commissioner of Patents, Washington, D. C."